United States Patent
Kong

(10) Patent No.: US 8,613,001 B2
(45) Date of Patent: Dec. 17, 2013

(54) HOST DEVICE HAVING MERGED PLUG-IN FUNCTION AND METHOD OF GENERATING MERGED PLUG-IN

(75) Inventor: Tae-kook Kong, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 969 days.

(21) Appl. No.: 11/705,513

(22) Filed: Feb. 13, 2007

(65) Prior Publication Data

US 2008/0016520 A1   Jan. 17, 2008

(30) Foreign Application Priority Data

Jul. 12, 2006   (KR) .................. 10-2006-0065569

(51) Int. Cl.
*G06F 3/00* (2006.01)
(52) U.S. Cl.
USPC .......................... 719/328; 719/330
(58) Field of Classification Search
USPC ............... 719/328, 310, 330; 717/109
See application file for complete search history.

(56) References Cited

U.S. PATENT DOCUMENTS

| | | | | |
|---|---|---|---|---|
| 6,332,163 B1 * | 12/2001 | Bowman-Amuah | ......... | 709/231 |
| 6,377,939 B1 * | 4/2002 | Young | ............. | 705/34 |
| 6,742,176 B1 * | 5/2004 | Million et al. | ............. | 717/120 |
| 6,743,176 B2 * | 6/2004 | Kato | ............. | 600/440 |
| 6,771,798 B1 * | 8/2004 | Haas et al. | ............. | 382/103 |
| 6,898,645 B2 | 5/2005 | Abujbara | | |
| 7,269,517 B2 * | 9/2007 | Bondarenko | ............. | 702/19 |
| 7,334,038 B1 * | 2/2008 | Crow et al. | ............. | 709/227 |
| 7,668,782 B1 * | 2/2010 | Reistad et al. | ............. | 705/50 |
| 2005/0283446 A1 | 12/2005 | Dettinger et al. | | |
| 2006/0218525 A1 * | 9/2006 | Yamashita | ............. | 717/109 |

FOREIGN PATENT DOCUMENTS

JP   2003208323   7/2003

OTHER PUBLICATIONS

Luke, A visual Medium for Programmatic Control of Interactive Applications, May 20, 1999.*
Chinese Office Action issued Apr. 21, 2010 in CN Application No. 200710101883.5.
Office Action issued in KR Application No. 10-2006-0065569 dated Mar. 22, 2013.

* cited by examiner

*Primary Examiner* — Lechi Truong
(74) *Attorney, Agent, or Firm* — Stanzione & Kim, LLP

(57) ABSTRACT

A host device having a merged plug-in function and a method of generating a merged plug-in. A storage unit stores a plurality of plug-ins necessary to process respective jobs. A plug-in generator is used to generate a merged plug-in to process a new job by associating respective jobs of selected existing plug-ins among the plurality of plug-ins. A workform generator is used to generate a workform necessary to request an external device to execute the new job using the merged plug-in generated by the plug-in generator. A central processing unit is used to process the workform generated by the workform generator and to store the workform in the storage unit.

16 Claims, 10 Drawing Sheets

HOST DEVICE HAVING MERGED PLUG-IN FUNCTION AND METHOD OF GENERATING MERGED PLUG-IN

CROSS-REFERENCE TO RELATED APPLICATIONS

This application claims the benefit under 35 U.S.C. §119 (a) of Korean Patent Application No. 10-2006-65569, filed Jul. 12, 2006, in the Korean Intellectual Property Office, the disclosure of which is incorporated herein by reference in its entirety.

BACKGROUND OF THE INVENTION

1. Field of the Invention

The present general inventive concept relates to a host device having a merged plug-in function and a method of generating a merged plug-in. More particularly, the present general inventive concept relates to a host device having a merged plug-in function and a method of generating a merged plug-in, which may process a plurality of jobs using the merged plug-in formed by merging respective jobs to process a plurality of plug-ins into the merged plug-in.

2. Description of the Related Art

A system using an image formation device and a web server is one in which a plurality of host devices share a plurality of image formation devices through a network. With the development of communication technology, the interest in document transmission systems has rapidly increased.

In a conventional system, a user either accesses a web server and manages the image formation device or manages the image formation device through a separate program installed at a host device. That is, the user requests jobs supported by the system using a web server or a host device with a separate program. For example, a job supported by the system includes a 'Scan to e-mail' job. The 'Scan to e-mail' job includes a function that scans a document positioned at the image formation device, converts the scanned data into a form suitable to be transmitted to an e-mail address of a recipient and transmits the converted data to the recipient. In order to request such a job, a user must set the 'Scan to e-mail' function through at least three steps, namely, 'scanning step→conversion step→e-mail address setting step of a recipient using a management program.

Therefore, in a method of requesting a series of jobs using the conventional system, it is necessary for the user to repeatedly select and to designate sequential steps with respect to jobs requiring a plurality of steps. Thus, when an often repeated job is used by a user that includes a plurality of steps, the user is inconvenienced by having to repeatedly select and designate the sequential steps. So, for example, when the user often uses the 'Scan to e-mail' function, the user is inconvenienced by having to repeatedly set at least the three steps noted above. This leads to user inconvenience.

SUMMARY OF THE INVENTION

The present general inventive concept provides a host device having a merged plug-in function and a method of generating a merged plug-in, which alleviate a user's inconvenience of repeatedly selecting (and/or designating) plug-in steps in every job that a user often executes which require a plurality of steps containing the selected (and/or designated) plug-in steps.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a host device having a merged plug-in function, including a storage unit to store a plurality of plug-ins necessary to process respective jobs, a plug-in generator to generate a merged plug-in to process a new job by combining existing plug-ins selected from among a plurality of plug-ins, a workform generator to generate a workform necessary to request an external device to provide (or execute) the new job using the merged plug-in generated by the plug-in generator, and a central processing unit to store the workform generated by the workform generator in the storage unit.

The new job may be a job defined by a merging of selected plug-ins. The plug-in generator may generate the merged plug-in to process a plurality of jobs by associating at least three of the plurality of plug-ins with each other, and setting multiple associated paths between the at least three plug-ins. The plug-in generator may designate a default path among the multiple associated paths set when a merged plug-in processes a plurality of new jobs. In an embodiment, the storage unit may store existing icons corresponding to the stored plug-ins, the generated merged plug-in, a name assigned to the generated merged plug-in, and a merging icon assigned to the generated merged plug-in. The plug-in generator may associate at least two existing icons (among the stored existing icons with each other)to generate the merged plug-in in which respective jobs of the associated icons are merged, and assign a stored merging icon to the generated merged plug-in. The central processing unit may control the storage unit to map and store the assigned merging icon to the merged plug-in.

The plug-in generator may generate a plug-in generation screen, which has a first window to display a plurality of existing icons corresponding to the respective stored plug-ins, and a second window to generate the merged plug-in by associating at least two existing icons among the plurality of (e.g., stored) icons. The host device may further include a user operation unit to select the at least two existing (e.g., stored) icons among the plurality of existing icons displayed on the first window, associating the at least two existing icons selected on the second window with each other, and to request a generation of the corresponding merged plug-in. The workform generator may generate a workform generation screen, which has a third window to display the stored existing icons and the merging icon, and a fourth window to generate the workform using the merging icon. The host device may further include a communication unit to transmit the generated workform to the external device through the network.

The foregoing and/or other aspects and utilities of the present general inventive concept may also be achieved by providing a method of generating a merged plug-in, including associating at least two plug-ins with each other, which are selected from stored plug-ins necessary to process their respective jobs, generating a merged plug-in so that the a new job is processed (or executed) by executing the respective jobs of the associated plug-ins, and generating a workform necessary to request an external device to execute the new job using the generated merged plug-in.

The method may further include storing the generated workform. The new job may be performed by a merging of the associated plug-ins. For example, when three plug-ins are selected, the generating of the merged plug-in may include generating the merged plug-in to process a plurality of jobs by setting associated multiple paths between the at least three plug-ins. The generating of the merged plug-in may include assigning a name and/or a merging icon to the merged plug-in. The method may further include mapping and storing the name and/or merging icon assigned to the generated merged plug-in. The generating of the merged plug-in may include generating a plug-in generation screen, which has a first window to display a plurality of existing icons corresponding to the respective plug-ins, and a second window to display the merged plug-in by associating at least two existing icons (and their respective jobs) among the plurality of existing icons. The generating of the workform may include generating a workform generation screen, which has a third window to display the stored existing icons and the merging icon, and a fourth window to generate the workform using the merging icon.

The foregoing and/or other aspects and utilities of the present general inventive concept may also be achieved by providing a network system, including a host device to associate at least two plug-ins with each other, which are selected from plug-ins to process respective jobs, to generate a merged plug-in, so that a new job defined by combining the respective jobs of the associated plug-ins, and to generate a workform to request an external device to execute the new job using the generated plug-in.

The foregoing and/or other aspects and utilities of the present general inventive concept may also be achieved by providing a network system, including a host device to generate a screen representing a plug-in icon to associate at least two plug-ins as a merged plug-in.

The foregoing and/or other aspects and utilities of the present general inventive concept may also be achieved by providing a network system, including a host device to generate a screen representing a merging tab to show at least one merged plug-in which is created by associating at least two plug-ins.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 5A to 5C are views illustrating workform generation screens to generate workforms using a merged plug-in.

DETAILED DESCRIPTION OF THE PREFERRED EMBODIMENTS

Figure 1:
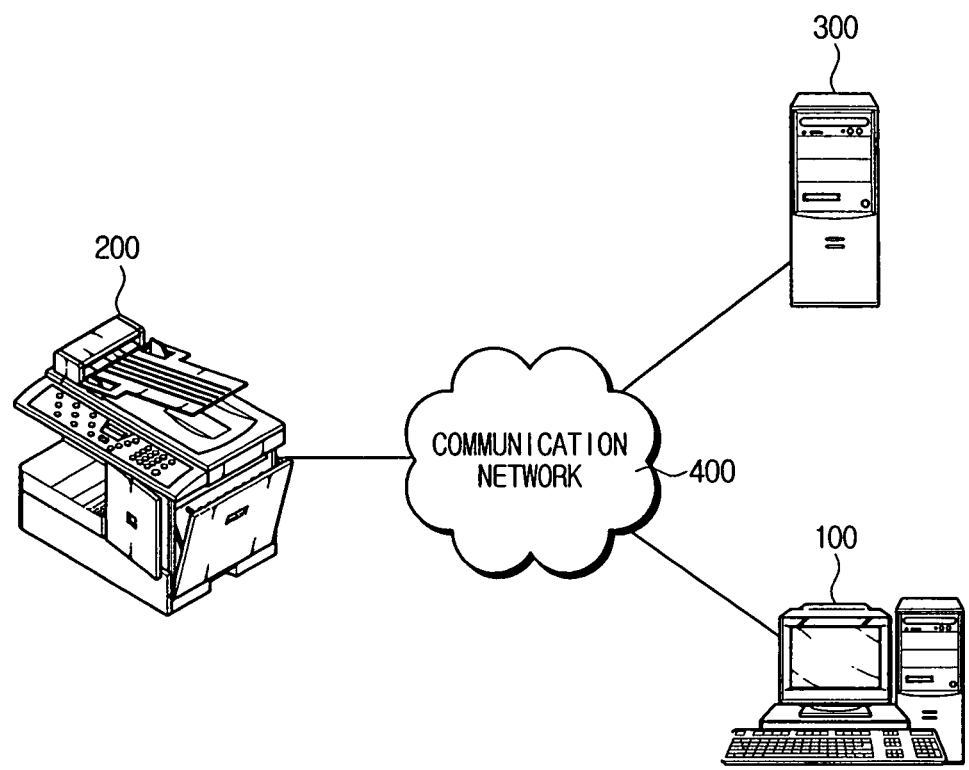
FIG. 1 is a view illustrating a network system to which a host device having a merged plug-in function is applied according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating a network system to which a host device having a merged plug-in function is applied according to an embodiment of the present general inventive concept.

With reference to FIG. 1, the network system includes a host device 100, a device 200, and a web server 300 which are connected via communication network 400. In the network system, a plurality of host devices 100 may be connected to a plurality of devices 200 through the communication network 400. While the present general inventive concept has been described with one host device 100 connected to one device 200 to facilitate the description, multiple host devices 100 may be connected to multiple devices 200.

The host device 100 is a device such as personal computer, PDA, or laptop computer. A user accesses the web server 300 using a web browser installed at the host device 100, logs-on the web server 300, and generates or edits a workform using a user interface (UI) screen such as a web page. The generated or edited workform can be stored in the web server 300 by each user.

The host device 100 generates a user interface (UI) screen to manage jobs supported by the device 200 through an application program, which may be installed at the host device 100, and generates or edits a workform associated with the device 200 through the generated user interface screen.

The host device 100 can store a plurality of plug-ins needed to process a plurality of respective jobs, and can provide a function to generate a merged plug-in by associating the plurality of plug-ins with each other. The generated merged plug-in serves to simplify a generation of the workform. A more detailed description thereof will be provided with reference to FIG. 2 later. The workform includes all information necessary to execute a series of respective jobs associated with the device 200. For example, the workform may be formed in an XML (eXtensible Markup Language) format. Also, for example, the workform may include information such as listing of devices to execute jobs, a running order of the jobs, and a status of the jobs.

The device 200 may include a program installed therein, which communicates with the host device 100 and the web server 300. Electronic devices suitable to be used in conjunction with the present general inventive concept include, but are not limited to, devices 200 such as facsimiles to execute a facsimile-transmission, scanners to execute a scanning job, copy machines to execute a copying job, multi function peripherals including printer, facsimile, scanner, and copy machine functions, household electric appliances, communication devices or other devices to execute their respective jobs.

When the device 200 receives a workform selected by the user from the web server 300 or the host device 100, the device 200 performs (or executes) a job based on the received workform. When the job requested by the user is a 'Scan to Mail' job, and the selected workform has a job condition, for example, to scan and transmit documents with a resolution of 300 dpi to an external mail recipient, the device 200 performs the 'Scan to Mail' job corresponding to a job condition set at the workform.

The web server 300 can store a user's log-on information (ID and password) which the user would have previously registered, and a plurality of workforms can be set according to each user. When the user logs onto the web server 300 through the host device 100 or the device 200, the web server 300 can execute a user authentication through stored information.

Further, the web server 300 can cause the user having completed the user authentication to set or edit the workform. The web server 300 can generate the workform using a web language such as XML. When the user selects one workform from a web page provided by the web server 300, the web server 300 displays the selected workform on the web page. The communication network 400 may be constructed by Internet by hub and LAN, in addition to a cable connected to a parallel port or a USB port.

Hereinafter, an image formation device such as a multifunction peripheral is referred to as 'device 200', and a user computer with an application program to generate the workform is referred to as 'host device 100'.

Figure 2:
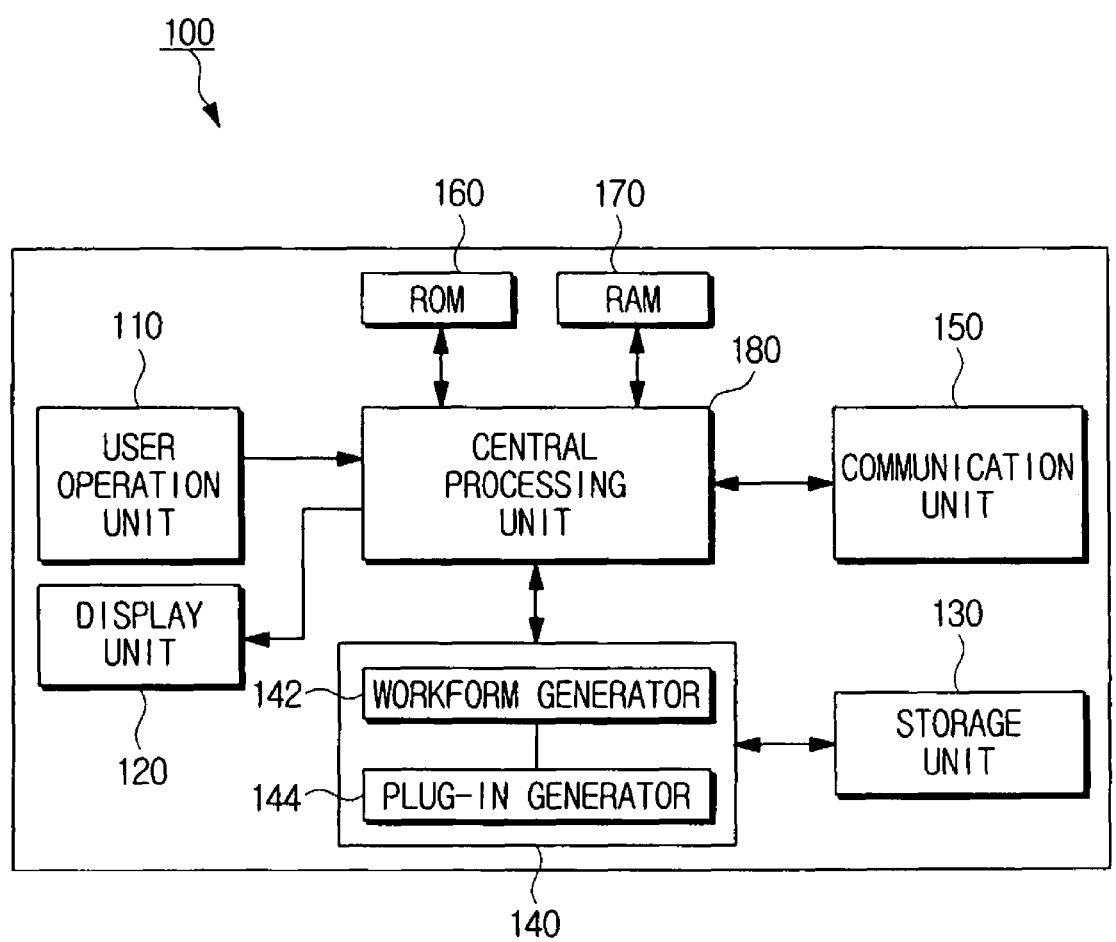
FIG. 2 is a block diagram illustrating the host device illustrated in FIG. 1.

FIG. 2 is a block diagram illustrating the host device 100 suitable to generate a merged plug-in according to an embodiment of the present general inventive concept.

With reference to FIGS. 1 and 2, the host device 100 suitable to generate a merged plug-in according to an embodiment of the present general inventive concept includes a user operation unit 110, a display unit 120, a storage unit 130, a workform formation unit 140, a communication unit 150, a ROM 160, a RAM 170, and a central processing unit 180. Additional parts and/or components not needed for an understanding of the present general inventive concept by one skilled in the art are not illustrated to facilitate a description of the present general inventive concept.

The user operation unit 110 can be a user interface such as key board or mouse associated with a screen. The user operation unit 110 outputs a signal to select and request functions provided by (or supported by) the host device 100. A user can manipulate the user operation unit 110 to request a display of a plug-in screen to generate a merged plug-in and to request a display of a workform screen to generate workforms. Furthermore, the user can manipulate the user operation unit 110 to generate or edit a desired merged plug-in and a workform associated with a series of desired jobs.

The display unit 120 displays a plug-in screen and a workform screen under control of the central processing unit 180. In detail, when the user operation unit 110 requests an execution of a program associated with the generation of a merged plug-in, the display unit 120 displays a plug-in screen provided by the plug-in generator 144. In addition, when the user operation unit 110 requests an execution of the program associated with generation of a workform, the display unit 120 displays a workform screen provided by a workform generator 142.

Examples of such a display unit 120 include (but are not limited to) display panels such as LCD (Liquid Crystal Display), CRT (Cathode Ray Tube), or PDP (Plasma Display Panel). A program associated with the merged plug-in and a program associated with generation of a workform can be embodied in one program or in separate respective programs.

The storage unit 130 can store a plurality of plug-ins, a plurality of icons corresponding to the respective plug-ins, and a merging icon to be assigned to the generated merged plug-in, which are necessary to process and execute jobs of the host device 100 with the device 200. The plurality of plug-ins can be software necessary to request, process, and/or execute jobs, which are required to generate the corresponding workform. For example, the plurality of plug-ins may include a plug-in to request a scanning job, a plug-in to request a facsimile job, a plug-in to request an OCR (Optical Character Recognition) function, and/or a plug-in to request e-mail transmission. Other plug-ins may be used.

In addition, the storage unit 130 can store a program necessary to generate a workform generation screen and to generate a workform by the workform formation unit 140, and a program necessary to generate a plug-in generation screen and to generate a merged plug-in by the plug-in generator 144. The workform formation unit 140 generates workforms using stored plug-ins and a merged plug-in is generated by a merger of plug-ins. In order to do this, the workform formation unit 140 includes a workform generator 142 and a plug-in generator 144. When the user operates the user operation unit 110 to request an execution of a program associated with a generation of the workform, the workform generator 142 generates a workform generation screen as illustrated in FIG. 3.

Figure 3:
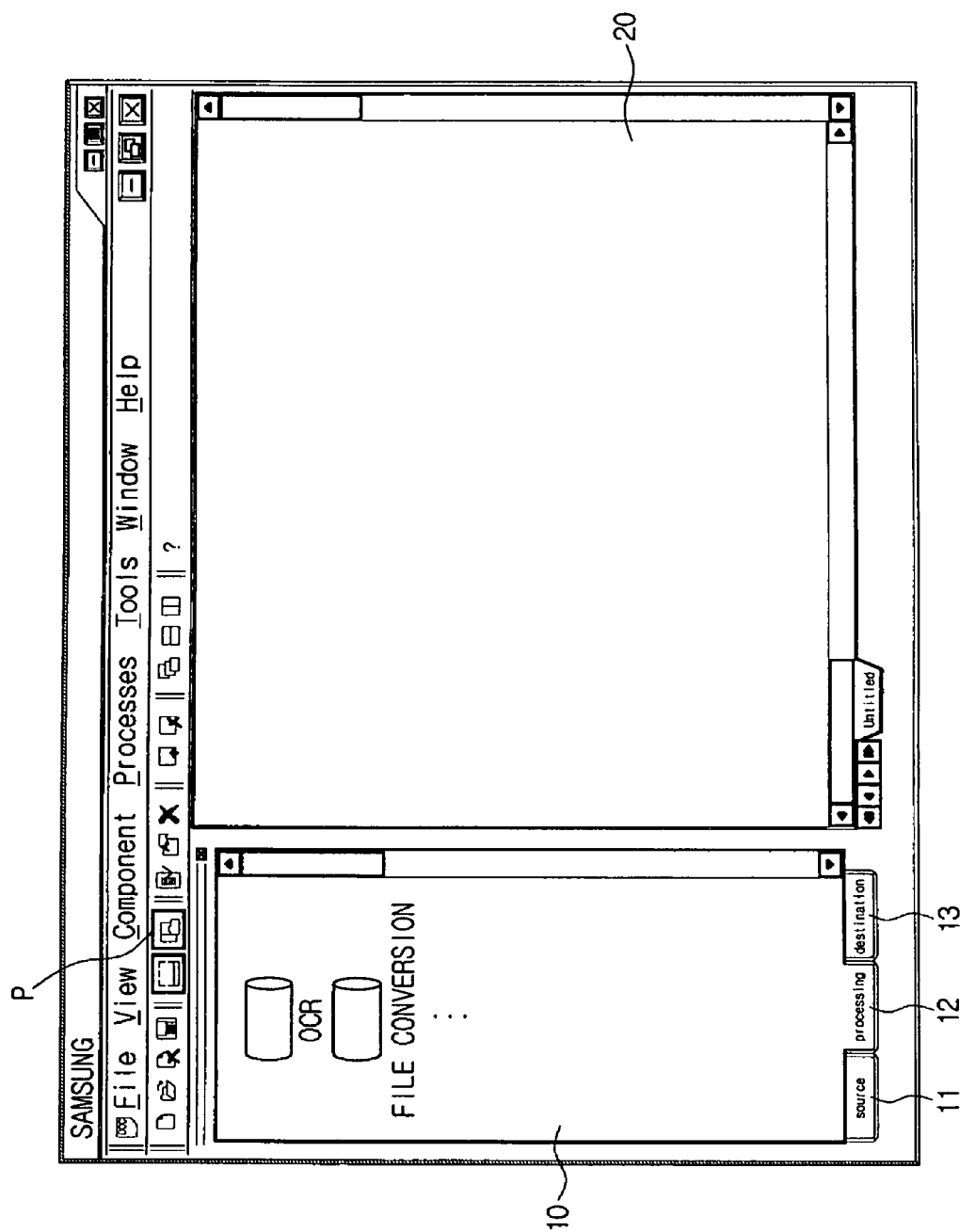
FIG. 3 is a view illustrating a workform generation screen displayed on a display unit of FIG. 2.

FIG. 3 is a view illustrating a workform generation screen displayed on a display unit of FIG. 2, for example. Referring to FIG. 1 to FIG. 3, the workform generation screen includes a first window 10, a second window 20, and an icon p. An existing icon (e.g., OCR and FILE CONVERSION) corresponding to a part of a plug-in stored in the storage unit 130 is displayed on the first window 10. The second window 20 is used to generate a desired workform using the existing icon on the first window 10. The icon p is used to request generation of a merged plug-in.

In detail, the first window 10 includes a source tab 11, a processing tab 12, and a destination tab 13. An icon of a plug-in to provide data to be used in the workform is displayed on the source tab 11. An icon of a plug-in to instruct a substantial method to process data to be used in the workform is displayed on the processing tab 12. An icon of a plug-in to indicate as to where processed data is transmitted is displayed on the destination tab 13.

For example, a scan icon assigned to process scanned data, a facsimile icon assigned to process data to be transmitted to a facsimile, and an e-mail icon assigned to process data to be transmitted to an e-mail recipient are displayed on the source tab 11. An OCR icon assigned to OCR process data selected in the source tab 11, and a file conversion icon assigned to convert selected data into a designated file format are displayed on the processing tab 12. A plurality of icons including an e-mail icon assigned to instruct a transmission of data processed in a predetermined manner to an e-mail recipient, a folder icon assigned to store the processed data in a set folder of the host device 100, and a printing icon assigned to a printing job, are displayed on the destination tab 13. Here, OCR is an abbreviated form of Optical Character Recognition. When the user selects an OCR function, the host device 100 may extract text from a scanned image.

In FIG. 3, as the processing tab 12 is illustratively selected, an icon of an OCR plug-in associated with the text extracting and/or processing, and an icon of a plug-in to instruct a file conversion are displayed on the processing tab 12. The user operates the user operation unit 110 and selects a desired icon from the source tab 11, the processing tab 12, and the destination tab 13 so as to display a new workform on the second window 20. Here, an icon selected from the first window 10 can be designed to be displayed on the second window 20 in a Drag and Drop manner. On the other hand, in order to generate a merged plug-in using a plurality of plug-ins, a user operates the user operation unit 110 to request a generation of the merged plug-in. For example, the user operates the user operation unit 110 to select a merged plug-in button p displayed on the workform generation screen so as to request the generation of a merged plug-in.

When the merged plug-in is selected, the workform generator 142 outputs a signal to generate a plug-in generation screen to the plug-in generator 144. Accordingly, the plug-in generator 144 generates a plug-in generation screen as illustrated in FIG. 4A with the plug-in generation screen being displayed on the display unit 120.

Figure 4A:
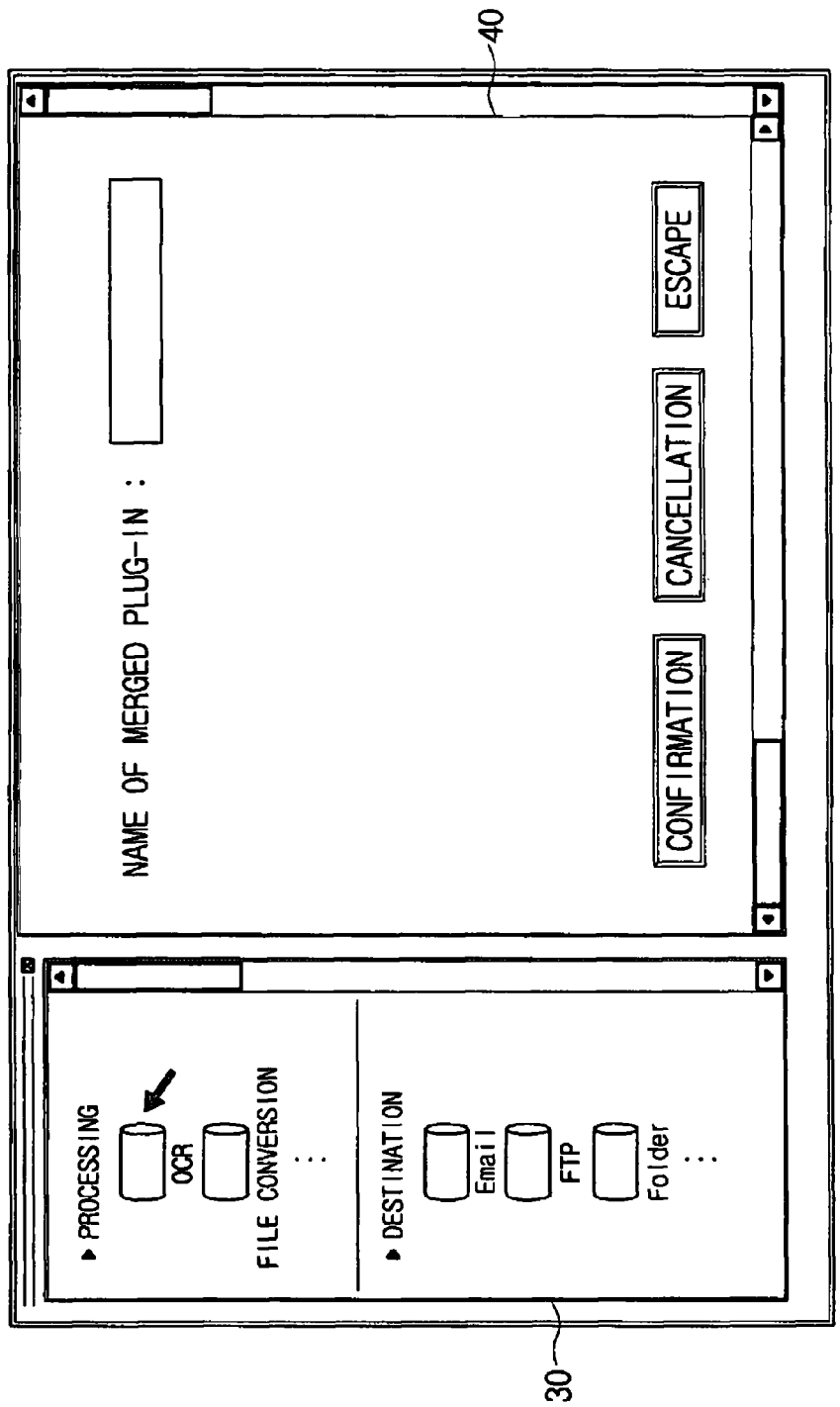
FIG. 4A is a view illustrating a plug-in generation screen initially displayed on the display unit of FIG. 2 when a merged plug-in button is selected.

FIG. 4A is a view illustrating a plug-in generation screen initially displayed on the display unit of FIG. 2 when, for example, a merged plug-in button p is selected.

Referring to FIG. 4A, the plug-in generator 144 generates a plug-in generation screen, which has a third window 30 on which all existing icons displayed on the processing tab 12 and the destination tab 13 of FIG. 3 are displayed, and has a fourth window 40 to generate a merged plug-in. As an example, the user operates the user operation unit 110 to sequentially select at least two icons among the existing icons displayed on the third window 30. The at least two selected existing icons are sequentially displayed on the fourth window 40 to be associated with each other. Start and end icons may be designed to be either always displayed or sometimes displayed (according to a user's selection) on the fourth window 40. Accordingly, the existing icons selected from the third window 30 are displayed and can be displayed between a displayed start icon and a displayed end icon. The user may enter a name of a merged plug-in in the fourth window 40.

Figure 4B:
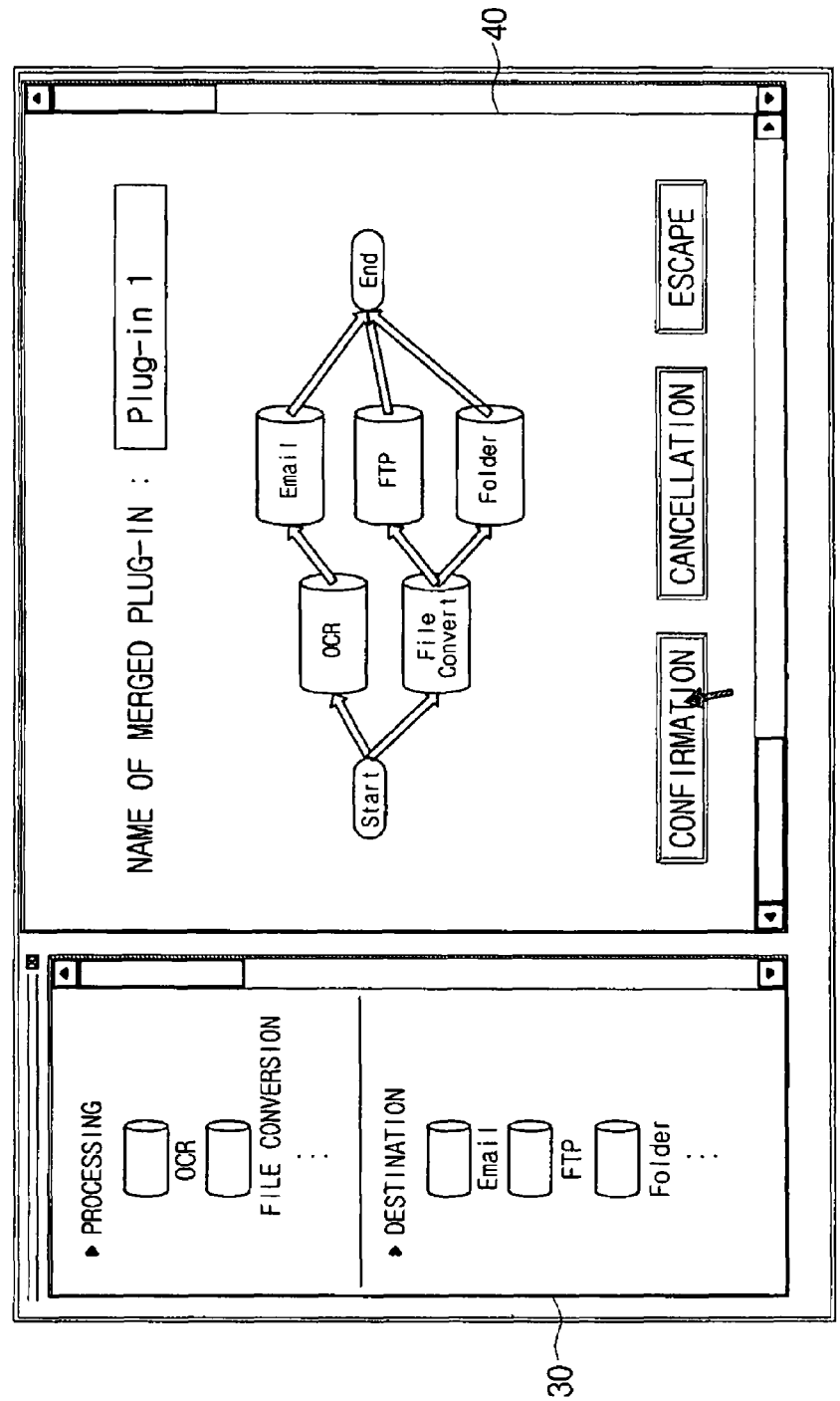
FIG. 4B is a view illustrating a first merged plug-in, which is generated via the plug-in generation screen of FIG. 4A.

FIG. 4B is a view illustrating a first example of a merged plug-in, which is generated through the plug-in generation screen of FIG. 4A. With reference to FIGS. 4A and 4B, the user selects an OCR icon, an e-mail icon, a file conversion icon, an FTP icon, and a folder icon from the third window 30 using the user operation unit 110. The selected icons are displayed on the fourth window 40, and an arrangement relation of respective icons can be changed by an operation of the user operation unit 110. Further, the user can arrange an arrow image between the respective icons to set a process procedure or path of data, as illustrated in FIG. 4B.

When the process or path of data is set, the user may assign a name (for example, Plug-in 1) to a new merged plug-in, which is generated by a merging of the selected icons (and an association of their respective jobs). Moreover, when a 'confirmation' button is selected on the screen of FIG. 4B, a newly generated merged plug-in may be stored in the storage unit 130 with the assigned name of 'Plug-in 1', and a merging icon may be assigned to the merged plug-in 'Plug-in 1' is given and stored together with the newly generated merged plug-in, for example.

On the other hand, the generated merged plug-in (Plug-in 1) can provide multiple data process paths. In the case of FIG. 4B, the generated merged plug-in (Plug-in 1) includes a first path of 'OCR→Email', a second path of 'file conversion→FTP', and a third path of 'file conversion→folder'. As described above, if one merged plug-in has multiple data process paths, the plug-in generator 144 generates a message screen to request selection of one of the multiple data process paths or to request setting a user defined default path. In this way, the merged plug-in can be conveniently used by a user during generation of a workform thereafter.

When a 'cancellation' button is selected on the screen of FIG. 4B, the merged plug-in to which a name of 'Plug-in 1' is assigned disappears from the fourth window 40. When an 'escape' button is selected, the plug-in generation screen itself disappears, but only a workform generation screen as illustrated in FIG. 3 is displayed on the display unit 120.

Figure 4C:
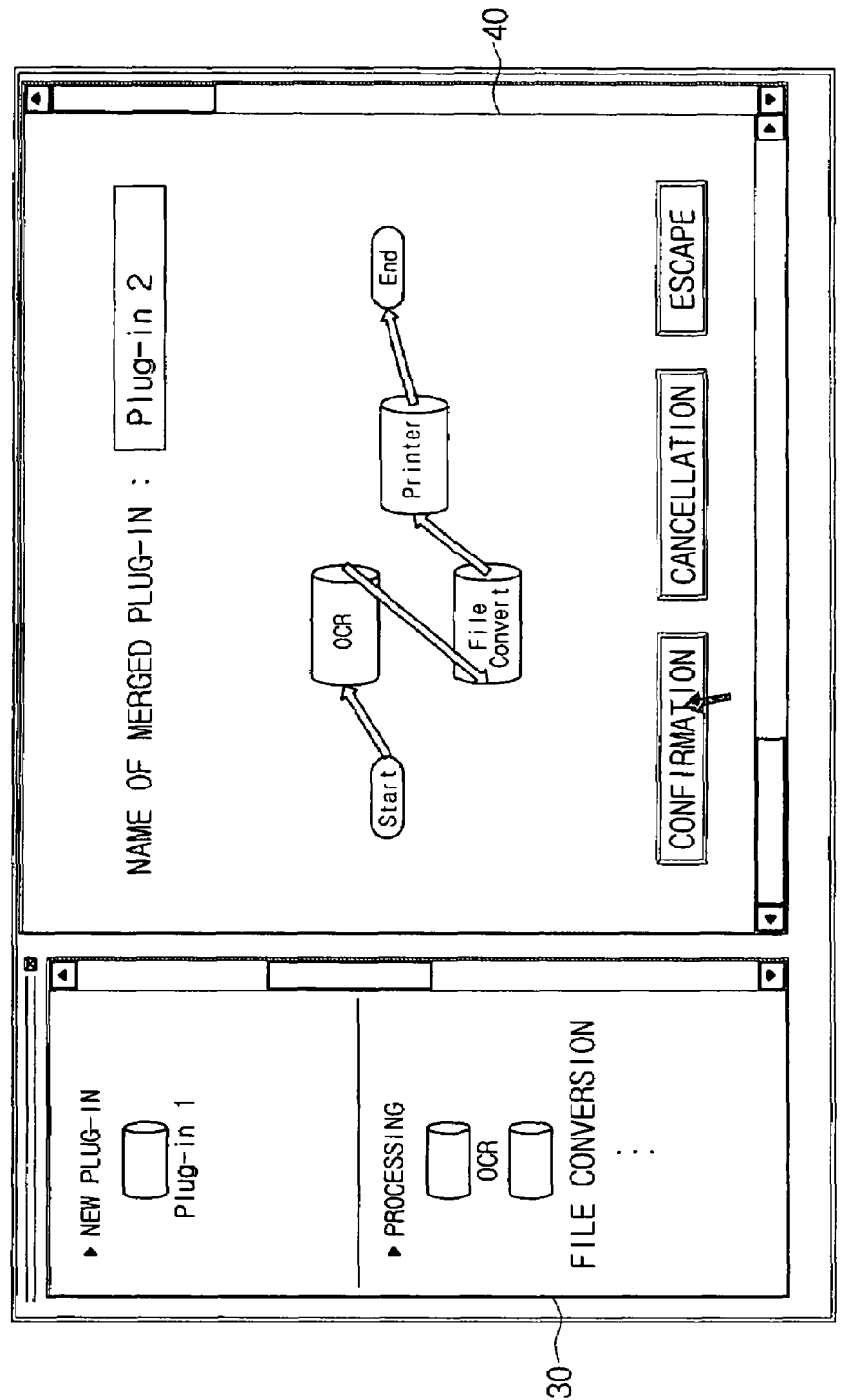
FIG. 4C is a view illustrating a second merged plug-in, which is generated via the plug-in generation screen of FIG. 4A.

FIG. 4C is a view illustrating a second example of a merged plug-in, which is generated through the plug-in generation screen of FIG. 4A. Referring to FIGS. 4B and 4C, an icon of the generated merged plug-in (Plug-in 1) in FIG. 4B is displayed on the third window 30 under "NEW PLUG-IN." When the user selects an OCR icon, a file conversion icon, and a printer icon from the third window 30 using the user operation unit 110, the selected icons are displayed on the fourth window 40, for example as illustrated in FIG. 4C. Also, the arrangement relation of respective icons can be changed by an operation of the user operation unit 110.

Further, the user can arrange an arrow image between the respective selected icons to set a process procedure or path of data, and can assign a name, 'Plug-in 2' (for example) to a new merged plug-in. Moreover, when a 'confirmation' button is selected on the screen of FIG. 4C, the plug-in generator 144 stores a newly generated merged plug-in in the storage unit 130 with the assigned name of 'Plug-in 2', and a merging icon assigned to the merged plug-in 'Plug-in 2' in the storage unit 130.

Where an arrangement relation of the selected icons is unsuitable, namely, where a path in which a merging of respective plug-ins is impossible to execute, the plug-in generator 144 generates and displays an error window or and/or plays an error warning sound indicating that the selected icons cannot be merged along the selected path. For example, when an FTP icon requesting an FTP function is requested to be processed ahead of an OCR icon, the plug-in generator 144 generates and displays the error window and/or sounds the error warning to the user. Because cases where merging is impossible have been previously stored in the storage unit 130, the plug-in generator 144 can judge whether a merging of selected plug-ins is possible. Also, the host device 100 may be able to recognize impossible merging selections where its syntax is illogical,—such as when a destination icon is selected ahead of a processing icon, etc.

Figure 5A:
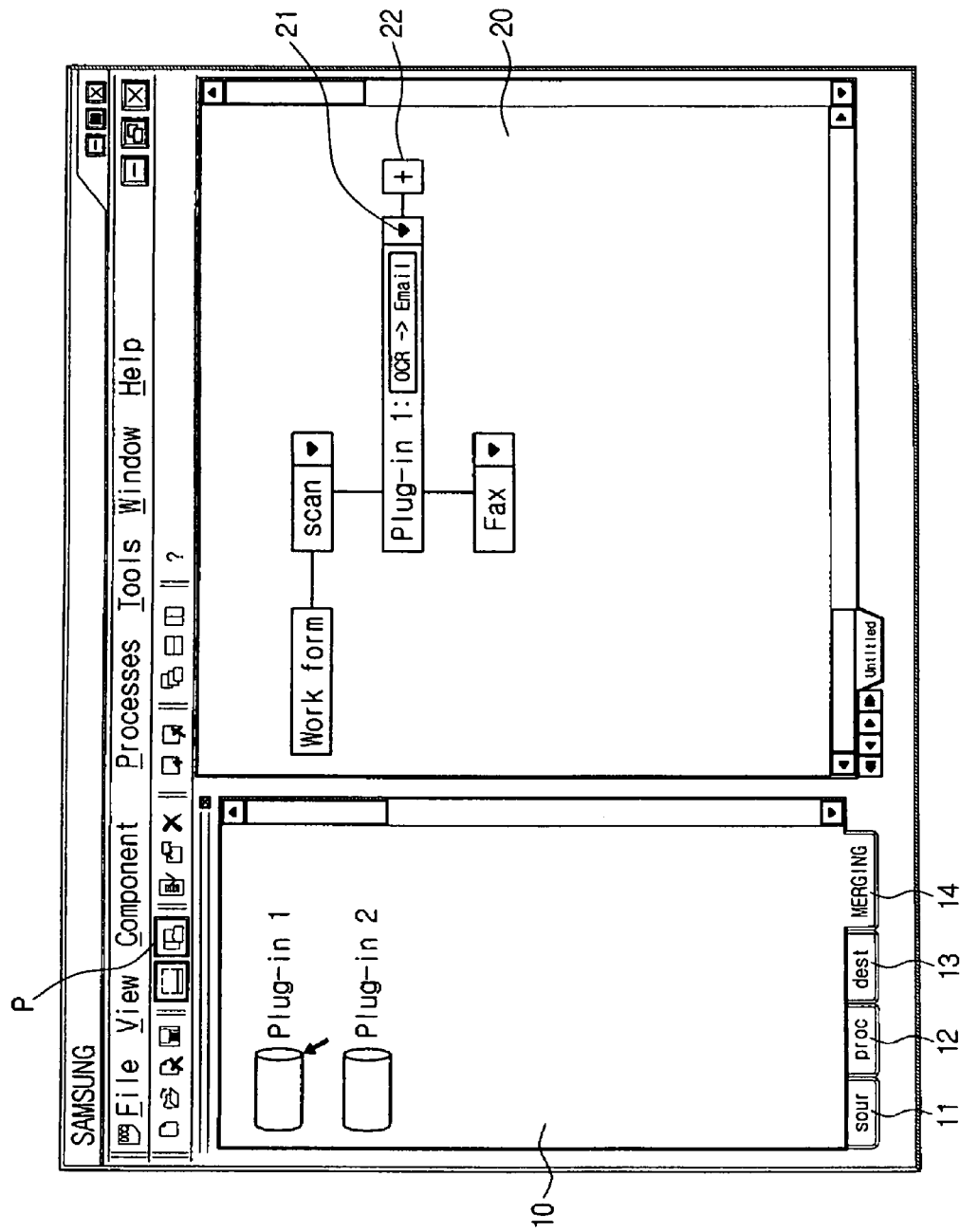
Figure 5B:
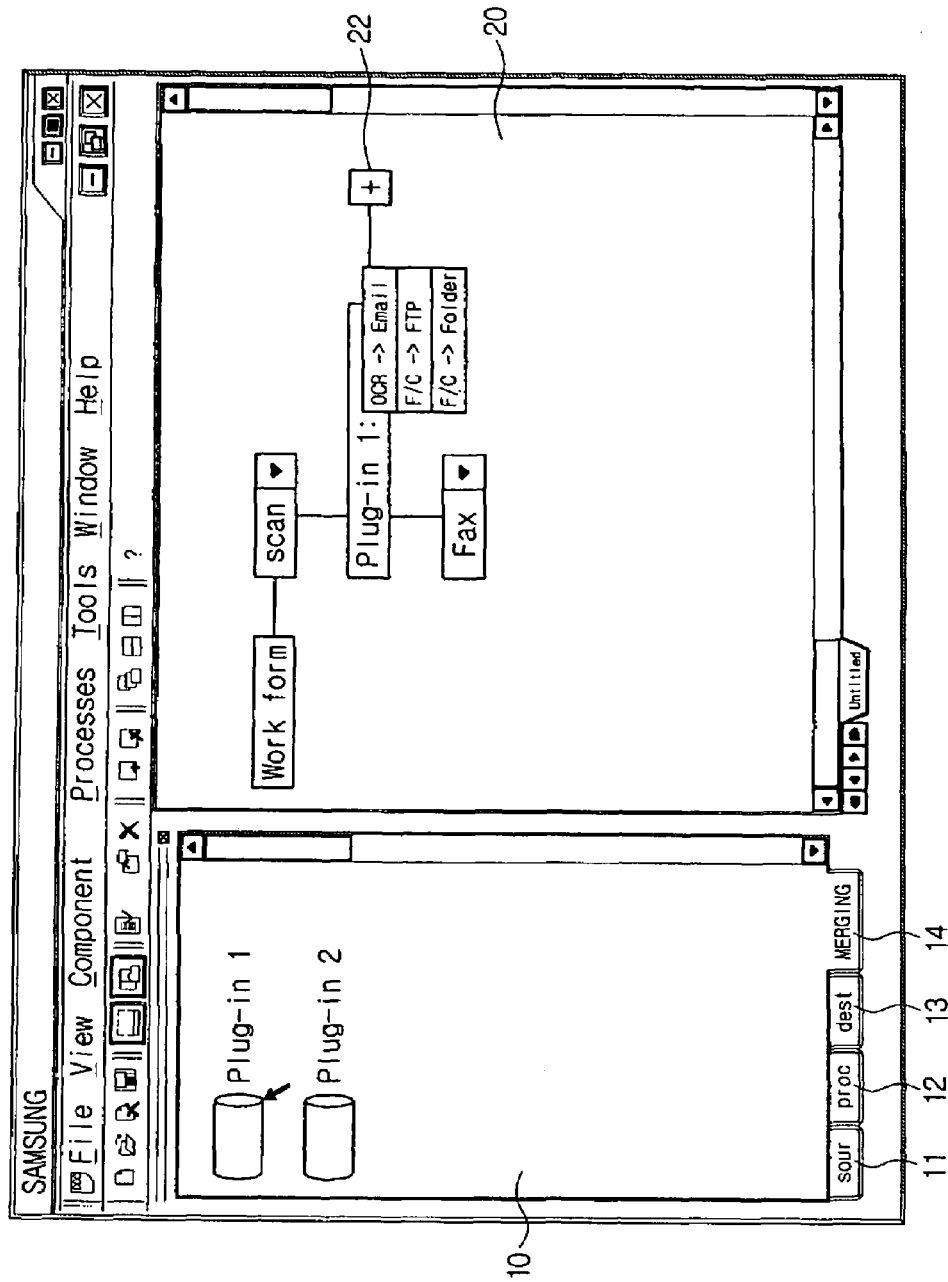
Figure 5C:
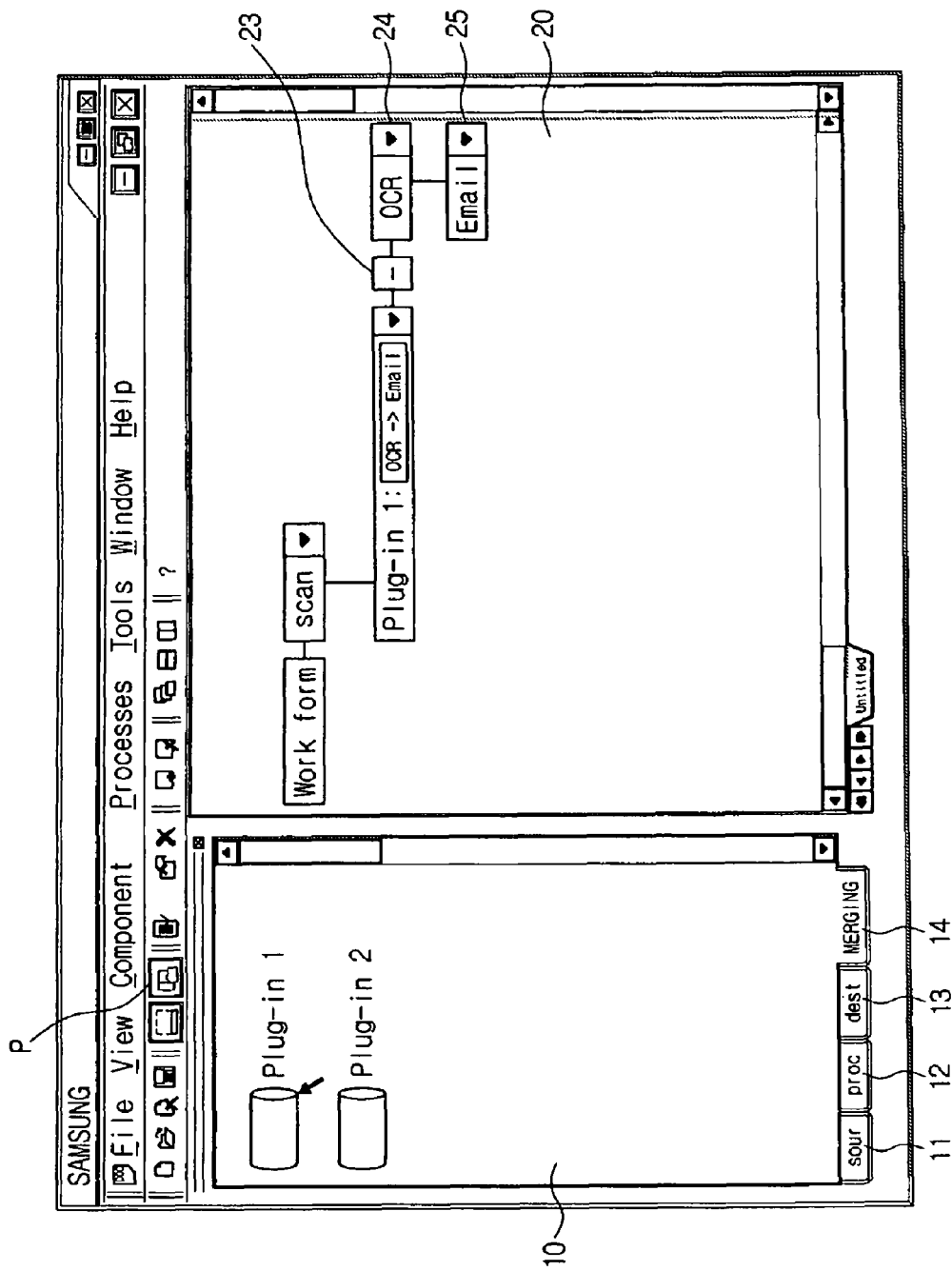

When a generation of the new merged plug-in is completed and a 'confirmation' button is selected, a workform generation screen (on which a merging icon of the generated merged plug-in is displayed) is displayed on the display unit 120, as illustrated in FIGS. 5A to 5C.

FIGS. 5A to 5C are views illustrating examples of a workform generation screen to generate a workform using a merged plug-in having been created and confirmed. With reference to FIG. 5A, the workform generator 142 further generates and displays a merging tab 14 on which an icon of the merged plug-in (or icons of merged plug-ins) is displayed on the workform generation screen. The user operates the user operation unit 110 to select data provided from a source tab 11 of the first window 10, to select a desired merged plug-in by the merging tab 14, and selects an icon (or other corresponding designation) corresponding to a final destination to which data is transmitted.

For example, when the user selects a scan icon from the source tab 11, the merged plug-in 'Plug-in 1' icon from the merging tab 14, and a facsimile icon from the destination tab 13, an image as illustrated in FIG. 5A is displayed in the second window 20. Thus, the user selects 'Plug-in 1' icon without having to select an 'OCR' icon and the associated 'Email' icon to request a function of OCR-processing scanned data and a function of transmitting the OCR-processed data by e-mail.

Here, because the merged plug-in 'Plug-in 1' has multiple paths, a first path set in a default path, namely, 'OCR→Email' is displayed on the 'Plug-in 1'. A drop-down menu button (▼) 21 is a button that requests a display of other paths set at the merged plug-in 'Plug-in 1'. Accordingly, when the drop-down menu button 21 is selected, the workform generator 142 displays all paths set at the merged plug-in 'Plug-in 1' as shown in FIG. 5B.

When a '+' button 22 is selected in FIG. 5A or FIG. 5B, the workform generator 142 displays the first path in detail as illustrated in FIG. 5C. That is, the workform generator 142 displays 'OCR' 24 and 'Email' 25, respectively. In addition, when a '−' button 23 is selected, the workform generator 142 generates a workform generator screen as illustrated in FIG. 5A. When the storage of a workform generated through procedures of FIGS. 5A to 5C is requested, the storage unit 130 stores the generated workform.

In another embodiment of the present general inventive concept, where the user selects a 'Plug-in 2' icon from the merging tab 14, the user can select just one icon without having to select an 'OCR' icon, a 'file conversion' icon, and a 'printer' icon to request an OCR function, a function of converting OCR-processed data into a set file format, and a function of printing the converted data. Thus, making three selections is now simplified into making one selection, for example, by executing the single merged 'Plug-in 2'.

Referring back to FIG. 2, the communication unit 150 communicates with the device 200 and the web server 300 through the communication network 400. For example, the communication unit 150 transmits a workform file to the device 200, and receives scanned data from the device 200 and facsimile data from an external facsimile machine. Furthermore, when the web server 300 provides a web page, the communication unit 150 receives the web page from the web server 300. So as to do this, a network interface card may be used as the communication unit 150.

The ROM 160 (read only memory) stores all kinds of programs necessary to embody a function of the host device 100. For example, an operating system of a windows version to drive the host device 100 may be stored in the ROM 160.

The RAM (random access memory) 170 stores all kinds of data generated during an execution of an operation in the host device 100. The central processing unit 180 controls a total operation of the host device 100 using all kinds of control programs stored in the ROM 160. For example, if the user operation unit 110 requests the central processing unit 180 to generate the workform, the central processing unit 180 executes the stored programs, and controls the workform generator 142 and the display unit 120 to generate and display the workform generation screen, respectively.

Furthermore, if the user operation unit 110 requests the central processing unit 180 to generate the plug-in, the central processing unit 180 executes the stored programs, and controls the plug-in generator 144 and the display unit 120 to generate and display the plug-in generation screen, respectively.

In addition, the central processing unit 180 processes and stores the generated workform, the generated merged plug-in, the name of the merged plug-in, and an assigned merging icon in the storage unit 130. When a transmission of the workform is necessary, the central processing unit 180 controls the communication unit 150 to transmit the workform to the device 200.

Figure 6:
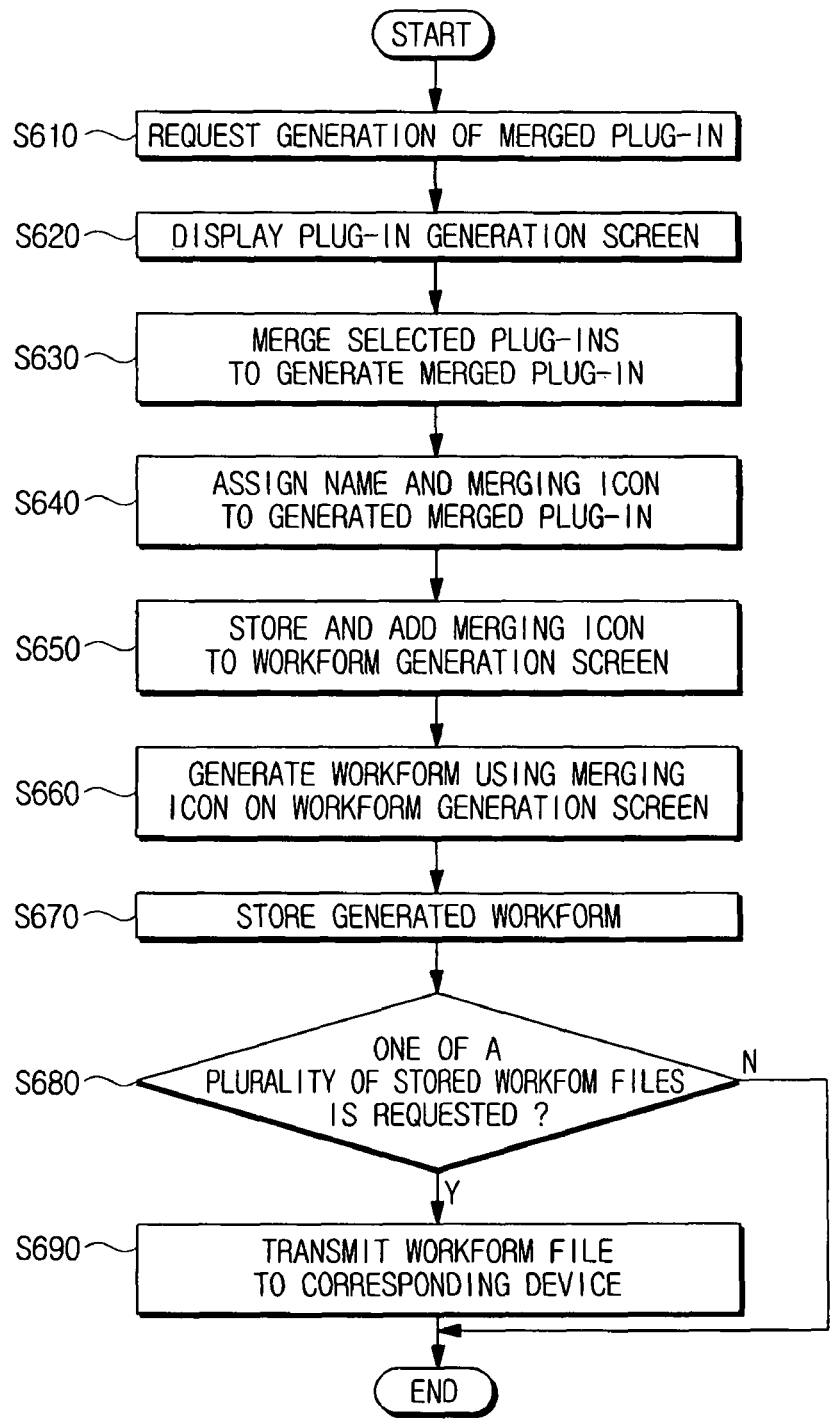
FIG. 6 is a flow chart that illustrates a method of generating a plug-in by the host device of FIG. 2.

FIG. 6 is a flow chart that illustrates a method of generating a plug-in by the host device 100 of FIG. 2. With reference to FIGS. 1 to 6, after the workform generation screen as shown in FIG. 3 was displayed, a generation of a merged plug-in is requested. In response, the central processing unit 180 executes a program associated with the generation of a merged plug-in, and controls the plug-in generator 144 and the display unit 120 to generate and display the plug-in generation screen as illustrated in FIG. 4A (operations S610 and S620).

After the plug-in generation screen as illustrated in FIG. 4A is displayed, when icons of a plug-in displayed on the third window 30 are selected, the plug-in generator 144 merges the selected plug-ins to generate the merged plug-in (operation S630). That is, the plug-in generator 144 associates icons of the selected plug-in with each other to generate a merged plug-in. Here, a user may enter or assign a name and a merging icon to the generated merged plug-in or the plug-in generator 144 automatically assigns the name and the merging icon thereto.

When the name is not assigned by the user to the merged plug-in generated by the user in operation S630, the plug-in generator 144 automatically assigns a predetermined name and merging icon to the generated merged plug-in (operation S640).

When operation S640 is performed, the central processing unit 180 processes and stores the generated merged plug-in, the assigned name of the merged plug-in, and the assigned merging icon in the storage unit 130, and processes them to be further displayed on a first window 10 of the workform generation screen (operation S650). In detail, a merging icon corresponding to the generated merged plug-in is further displayed on a merging tab 14 of the first window 10.

After the performance of operation S650, when generation of a workform is completed using a merging icon displayed on the first window 10 by user manipulation of a user operation unit 110 (operation S660), the central processing unit 180 stores the generated workform in the storage unit 130 as a file (operation S670).

After the performance of operation S670, when one of a plurality of stored workform files is requested (operation S680), the central processing unit 180 reads the selected workform file from the storage unit 130, and controls the communication unit 150 to transmit the read workform file to the device 200 (operation S690).

While embodiments of the present general inventive concept have been described such that an application program is installed at the host device 100 to generate a merged plug-in and the host device 100 generates the workform using the generated merged plug-in, the aforementioned operations can be performed by coordinated communication between the host device 100 and the web server 300. That is, where the host device 100 has a web browser such as Explorer therein, it may access and request a web page of the web server 300 to generate a merged plug-in, for example. In this case, screens of FIGS. 3, 4A to 4C, 5A to 5C are provided on the web page, and the user can generate the merged plug-in and the workform using a web page screen displayed on the display unit 120 of the host device 100. The generated merged plug-in and workform may be stored if not requested to be transmitted to the device 200.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As is seen from the foregoing description, in the host device having a merged plug-in function and a method of generating a merged plug-in according to the present general inventive concept, a generation of a merged plug-in may improve a user's convenience wherein the merged plug-in merges respective jobs of the plurality of plug-ins. In detail, by using a merged plug-in in which jobs for at least two plug-ins are merged, a user's inconvenience of repeatedly selecting a plurality of plug-ins in every job is reduced, especially when a large number of plurality of jobs need to be executed. Also, where a user attempts to generate a merged plug-in, but the plug-in selection is impossible to execute, the system provides an error window, and/or plays an error sound thereby preventing the error. In addition, when multiple paths are set at one merged plug-in, the user can more easily make a workform using such a merged plug-in, which may be often used.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A host device usable in a network system, comprising:
   a storage unit to store a plurality of plug-ins necessary to process respective jobs;
   a plug-in generator to generate a merged plug-in by associating selected existing plug-ins from among the plurality of plug-ins, to set multiple associated paths with the selected existing plug-ins, and to designate a default path from the multiple associated paths;
   a workform generator to generate a workform necessary to request an external device to execute a new job using the merged plug-in generated by the plug-in generator; and
   a central processing unit to process the workform generated by the workform generator in order to store the workform in the storage unit,
   wherein the workform generator generates a workform generation screen, which has a window to display stored existing icons and a merging icon, and another window to generate the workform using the merging icon.

2. The host device as claimed in claim 1, wherein the new job is defined by the generated merged plug-in of the associated plug-ins.

3. The host device as claimed in claim 1, wherein the plug-in generator generates the merged plug-in by associating at least three of the plurality of plug-ins with each other, and by setting multiple associated paths between the at least three plug-ins.

4. The host device as claimed in claim 1, wherein the storage unit stores existing icons corresponding to the stored plug-ins, the generated merged plug-in, a name assigned to the generated merged plug-in, and a merging icon assigned to the generated merged plug-in.

5. The host device as claimed in claim 4, wherein the plug-in generator associates at least two stored plug-ins and corresponding existing icons with each other to generate the merged plug-in in which the respective jobs of the associated stored plug-ins are merged, and assigns the stored merging icon to the generated merged plug-in.

6. The host device as claimed in claim 5, wherein the central processing unit controls the storage unit to map and store the assigned merging icon to the merged plug-in.

7. The host device as claimed in claim 4, wherein the plug-in generator generates a plug-in generation screen, which has a first window to display a plurality of existing icons corresponding to the respective stored plug-ins, and a second window to generate the merged plug-in by associating at least two existing icons among the plurality of existing icons.

8. The host device as claimed in claim 7, further comprising:
   a user operation unit to select the at least two existing icons among the plurality of existing icons displayed on the first window, to associate the at least two existing icons selected on the second window with each other, and to request a generation of the merged plug-in.

9. The host device as claimed in claim 1, further comprising:
   a communication unit to transmit the generated workform to the external device through a network.

10. A method of a host apparatus usable in a network system, the method comprising:
    associating at least two plug-ins with each other in the host apparatus, which are selected from plug-ins necessary to process respective jobs;
    generating a merged plug-in with the host apparatus so that a new job is defined by combining the respective jobs of the associated plug-ins;
    setting multiple associated paths with the selected plug-ins and designating a default path from the multiple associated paths; and
    generating a workform with the host apparatus necessary to request an external device to execute the new job using the generated merged plug-in,
    wherein the generating of the merged plug-in with the host apparatus comprises generating a plug-in generation screen, which has a first window to display a plurality of existing icons corresponding to the respective plug-ins on the host apparatus, and a second window to generate a merged plug-in by associating at least two existing icons among the plurality of existing icons.

11. The method as claimed in claim 10, further comprising: storing the generated workform in the host apparatus.

12. The method as claimed in claim 10, further comprising: executing the new job with the external device by executing the merged plug-in by processing the workform.

13. The method as claimed in claim 10, wherein when three plug-ins are selected, the generating of the merged plug-in with the host apparatus comprises generating the merged plug-in by setting multiple associated paths between the at least three plug-ins.

14. The method as claimed in claim 10, wherein the generating of the merged plug-in with the host apparatus comprises assigning a name to the merged plug-in and assigning a merging icon corresponding to the generated merged plug-in.

15. The method as claimed in claim 10, further comprising:
    mapping and storing the assigned name and the assigned merging icon to the generated merged plug-in with the host apparatus.

16. The method as claimed in claim 10, wherein the generating of the workform comprises generating a workform generation screen, which has a third window to display the stored existing icons and the merging icon, and a fourth window to generate the workform using the merging icon.

* * * * *